UNITED STATES PATENT OFFICE.

RALPH H. McKEE, OF NEW YORK, N. Y.

PROCESS OF EXTRACTING OILS, FATS, AND FATTY ACIDS.

1,376,211.     Specification of Letters Patent.     Patented Apr. 26, 1921.

No Drawing.     Application filed May 24, 1919. Serial No. 299,465.

*To all whom it may concern:*

Be it known that I, RALPH H. McKEE, a citizen of the United States, residing at New York, in the county of New York and State of New York, have invented certain new and useful Improvements in Processes of Extracting Oils, Fats, and Fatty Acids, of which the following is a specification.

This invention relates to processes of extracting oils, fats and fatty acids from oily material of a vegetable or animal character, and has particular reference to an improved process of effecting their extraction in an economical and commercially practical manner by means of liquid sulfur dioxid.

Something over thirty years ago liquid sulfur dioxid was proposed as a solvent for fats and oils, and many attempts have been made to utilize this material in a practically economical way in the extraction of oils and fats, but so far as the applicant is informed, no process sufficiently economical for commercial use has heretofore been found.

Attempts to extract oils and fats from vegetable and animal matter without preliminary treatment have been made at high superatmospheric pressure and at temperatures which, although below 100° C., are high considering the volatility of liquid sulfur dioxid; but an extended investigation made by the applicant failed to show that any commercial success has heretofore been attained in efforts to make practical use of liquid sulfur dioxid as a solvent for animal or vegetable fats or oils.

Now I have discovered that if the material from which the oils, fats or fatty acids are to be extracted is first subjected to a dehydrating operation, as by the use of heat and vacuum whereby the free (uncombined) water present is substantially or wholly removed, the oils, fats or fatty acids present therein can be satisfactorily and economically extracted by the action of liquid sulfur dioxid and that the extraction can be effected at ordinary atmospheric temperatures and at a pressure only sufficiently high (about 45 pounds) to maintain the extracting agent in liquid form.

An important application of my process is to the extraction of oils from crushed seeds or nuts, such as linseed, flaxseed, castor-oil beans, peanuts, cocoanut and the like, and in such extraction the crushed seeds or nuts are first dehydrated to remove all or substantially all of the free water present therein. The resulting mass is then extracted with liquid sulfur dioxid by the same procedure in which extractions are ordinarily made with volatile solvents, such as gasolene, the extraction apparatus being, however, made sufficiently strong to withstand the increased pressure of the sulfur dioxid vapor over that of the ordinary volatile solvents ordinarily used, as will be readily understood.

The extraction may be made by the use of a single charge of sulfur dioxid, the treatment being continued until substantially all of the oil is dissolved but it is ordinarily advisable to first subject the material under treatment to the action of one charge of sulfur dioxid, then to draw off the solvent and dissolved content and repeat the operation one or more times until the oil is sufficiently extracted.

In some cases it is advantageous to utilize the liquid sulfur dioxid used in treating one batch of oil-containing material in the treatment of a second batch, the solvent dissolving a portion or substantially all of the oils as desired, from each batch. In this case, the solvent used in treating the material in one extractor can be transferred to and used in treating material in one or more other extractors, as will be readily understood by those skilled in this art.

The dissolved oil and solvent may be separated in any desired way either in the extractor in which the extraction is made or it may first be drawn off, the separation in each case being preferably effected by distilling off and condensing the sulfur dioxid.

The oil and the meal from which the oil is extracted can be advantageously treated to remove the residual sulfur dioxid by blowing air or steam therethrough until the solvent is wholly or substantially wholly eliminated. After this treatment, the oil is ready for bleaching or other chemical treatment before being marketed. For some purposes no further treatment of the oil after the removal of the sulfur dioxid will be necessary.

The sulfur dioxid obtained by blowing air or steam through the oil or meal can be recovered and condensed in any desired manner.

While the extraction may be carried out at ordinary atmospheric temperature, it will be understood that the length of time of the treatment may be lessened by the application of heat to the material under treatment. When heat is used, I preferably employ a temperature of from about 20° to 25° C., but it is to be understood that the degree of heat and consequent pressure in the extractor, may be widely varied and that the temperature selected will be determined largely by considerations of economy in the practice of the process.

Where I treat a batch of oil containing material with more than one charge of sulfur dioxid, I prefer to treat the batch first at ordinary atmospheric temperature but I may advantageously treat the batch the second time at a somewhat elevated temperature and, similarly, where I successively treat two or more batches of oil containing material with a single charge of sulfur dioxid, I prefer to treat the first batch with the solvent at ordinary atmospheric temperature but may advantageously treat the other batch or batches with the solvent containing oil extracted in treating the first batch at a somewhat elevated temperature.

My process may advantageously be used in the extraction of oils and fats from animal sources, such as fish, fish offal and the like, in which case the material is first dehydrated as already described.

Another important application of my process is to the extraction of oils, fats and fatty acids from sewerage sludge however obtained, but an adaptation of such process is particularly important in extracting these materials from sludges produced by the process of sewerage treatment worked out at Bradford, England, and later modified by George A. Miles and R. S. Western. In this process, the sewage is treated with either sulfuric acid or sulfur dioxid, the sulfur dioxid being the cheaper and approximately as satisfactory in use as the sulfuric acid. This treatment brings about a separation of the suspended matter in the sewerage and the destruction of a large portion of the bacteria. As at present carried out, the sewerage sludge so formed is extracted with gasolene and yields considerable value in oils, fat and fatty acids.

I have found that liquid sulfur dioxid is a particularly good solvent for the oils, fats and fatty acids in sewerage sludge. A portion of the fats contained in such sludge is present as free oleic and stearic acids which are readily dissolved by the liquid sulfur dioxid. In the use of my process, the sewer sludge is first dehydrated, the dried material extracted with liquid sulfur dioxid and the oils, fats and fatty acids separated from the solvent, all as hereinbefore described. The resulting fats and fatty acids are adaptable for the making of soap and for other uses.

The dried sludge which has been treated with the sulfur dioxid will of course, carry a residual amount of this material. This can be removed by blowing air or steam through the extracted dried sludge and the resulting current containing sulfur dioxid gas can be used to treat fresh portions of the sewerage, thereby materially lessening the expense of the treatment of the sewerage in accordance with the so-called Miles process, hereinbefore referred to. An important feature of my process is the utilization of the current of air or steam used in blowing the dried extracted sludge without further treatment in acidulating fresh portions of the sewerage and precipitating new quantities of sludge therein.

The method of dehydration used will naturally vary with the material being dehydrated. Seeds of moderate size can be dehydrated and extracted without being previously ground. I have done this with peanut and castor bean half kernels. For quantity production, however, these and other seeds would normally be ground to pass a 10 mesh sieve, and dehydrated by being placed on a warm surface with a current of warm air passing over same. For such a purpose, a Ruggles-Coles continuous rotary drier serves excellently. Other forms of driers which are steam heated are often of cheaper first cost, but not so economical of fuel or of so large a capacity. In drying such materials as seeds, the drier should be so regulated that the issuing dried product will carry approximately 10 per cent. moisture and not exceed a temperature of 80° C. A less moisture content is, of course, an advantage in increasing the speed of extraction.

In the drying of sewerage sludge or other similar low grade material as it is obtained from the filter press, the preferred procedure is to use a direct heated rotary kiln so adjusted that the resulting dried sludge leaves the drier with approximately 10 per cent. of moisture and at a temperature approaching the boiling point of water. Higher temperature should be avoided.

While I have described in detail the preferred practice of my process, it will be understood that the details of procedure may be widely varied within the expected skill of the art and without departure from the spirit of the invention or the scope of the subjoined claims.

Having thus described my invention, I claim:

1. The process of extracting oils, fats and fatty acids which consists in dehydrating oil-containing material and subjecting such dehydrated material to the solvent action of liquid sulfur dioxid.

2. The process of extracting oils, fats and fatty acids from material containing the same which consists in dehydrating such material and subjecting the dehydrated material to the solvent action of liquid sulfur dioxid at approximately ordinary atmospheric temperature.

3. The process of extracting oils, fats and fatty acids from materials containing the same which consists in dehydrating such material, subjecting such dehydrated material to the solvent action of liquid sulfur dioxid at approximately ordinary atmospheric temperature and then subjecting such treated materials to the action of liquid sulfur dioxid at an elevated temperature.

4. The herein described process of treating sewerage which consists in effecting the precipitation of the solid portion thereof in the form of a sludge, drying such sludge and subjecting the dried sludge to the solvent action of liquid sulfur dioxid.

5. The herein described process of treating sewerage which consists in precipitating the solid portion thereof in the form of a sludge, drying the sludge, extracting the dried sludge with liquid sulfur dioxid, separating the sulfur dioxid and dissolved content from the extracted sludge, blowing the thus treated sludge with a current of a purifying agent to remove the residuent dioxid therefrom and passing a current of the purifying agent into fresh portions of sewerage to precipitate new quantities of sludge, substantially as described.

In testimony whereof I affix my signature in presence of two witnesses.

RALPH H. McKEE.

Witnesses:
L. V. EATON,
EDWARD M. FRANKEL.